United States Patent Office 3,758,290
Patented Sept. 11, 1973

3,758,290
CARBOTHERMIC PRODUCTION OF ALUMINUM
Robert M. Kibby, Florence, Ala., assignor to Reynolds Metals Company, Richmond, Va.
Continuation-in-part of application Ser. No. 799,672, Feb. 17, 1969, now Patent No. 3,607,221. This application July 21, 1971, Ser. No. 164,769
Int. Cl. C22b 21/02; C22d 7/02
U.S. Cl. 75—10 R                    6 Claims

ABSTRACT OF THE DISCLOSURE

A process for preparing an accurately controlled feed, having a 2:1 ratio of aluminum:carbon monoxide and a 1:1 atomic ratio of carbon:oxygen, for a carbothermic process wherein the feed, consisting essentially of aluminum monoxycarbide, is introduced into a heating zone and maintained therein at an elevated temperature sufficient to quickly vaporize all products to a vaporous mixture of essentially only gaseous aluminum and carbon monoxide. The vaporous mixture is then contacted in the absence of a reactive environment with a layer of liquid aluminum at a temperature sufficiently low that the vapor pressure of the liquid aluminum is less than the partial pressure of the aluminum vapor in contact with it and sufficiently high to prevent the reaction of carbon monoxide and aluminum, and finally, the substantially pure aluminum is recovered.

BACKGROUND OF THE INVENTION

Field of the invention

This invention is a continuation-in-part of the copending application Ser. No. 799,672, filed Feb. 17, 1969, now U.S. Pat. No. 3,607,221, and relates to a new and improved process for producing substantially pure aluminum metal under carbothermic conditions from aluminum oxides and carbon. It particularly relates to a process for producing aluminum monoxycarbide as an accurately controlled feed material therefor.

Description of the prior art

The prior art is aware of various methods of attempting to produce aluminum in a carbothermic process from an aluminum oxide such as alumina. Generally, however, the methods of the prior art have not provided means by which this process can be carried out successfully.

Generally, these carbothermic processes comprise heating the aluminum oxide and a carbon-containing compound such as aluminum carbide or elemental carbon in a heating zone under extremely high temperatures so as to form a vaporous mixture of aluminum and carbon monoxide. After this vaporous mixture is formed, various attempts have been made to condense the vaporous mixture in order to recover the elemental aluminum therefrom. However, in all the prior art processes embodying this concept, it has not been possible to recover substantially pure aluminum in this manner because when approaching condensation, the aluminum combines with carbon and carbon gases present at the condensing surfaces to form aluminum carbide so that free aluminum heretofore has not been successfully obtained.

In variations on this process, attempts have been made to circumvent the condensation problem by conducting the reduction steps so that the aluminum is not completely vaporized, which process would have the effect of separating the aluminum metal which remains in the condensed state from the reactants from which it is made. However, the results of this technique have similarly been unsatisfactory because of back reactions of aluminum with carbon-bearing materials derived from the reactants.

One process for the carbothermic reduction of metal oxides is that disclosed in U.S. Pat. 2,979,449. In this patented process, in which the metal to be recovered may be aluminum, a mixture of the metal oxides to be reduced and carbon is converted to a highly energized jet of elemental vapors consisting initially of carbon, the free metal and oxygen, all primarily in the form of monatomic gases. As the carbon is present in sufficient quantities to fix all the oxygen as carbon monoxide, the vapors will thereafter shortly consist of a mixture of carbon monoxide gas and metal vapor. The vapors are then condensed according to the patent at such a rate that, at the proper rate of cooling, the metal values are recovered in powder form while the carbon remains attached to the oxygen. This, of course, presupposes close control of the carbon content contained in the vapor, that is, the amount of carbon present must be such that all of it remains in combination with the oxygen present. As a practical matter, however, the procedure disclosed in this patent does not operate successfully because of the difficulty in control of the carbon values present and the fact that condensation is on a cool surface. Thus, very little pure aluminum can be recovered because as the gases cool, the aluminum recombines with carbon and/or carbon monoxide present to form aluminum carbide. The paragraph bridging columns 4 and 5 in this patent alludes to this problem but fails to offer any solution except to say if a proper rate of cooling is established the metal values may be recovered in powder form while the carbon seizes all the oxygen.

These patentees further note that they cool the mixture of gases down to a non-reactive temperature quickly enough that the back reaction cannot take place, column 5, lines 22–27. However, as mentioned, it is impossible to cool the gases sufficiently fast to obviate the back reaction as the laws of nature require that the cooling pass through a very reactive stage where the back reaction, or combination of aluminum and carbon, will take place. Hence, as a practical matter, very little aluminum will be recovered. Hence, this patent merely states the problem.

A similar process is disclosed in U.S. Pat. 3,230,072 in which aluminum oxide and carbon are vaporized to form a vaporous mixture of carbon monoxide and aluminum vapor at extremely high temperatures. However, the inventors in this patent attempt to circumvent the condensation problem by utilizing the lower specific gravity of aluminum as compared with fused aluminum oxide, by floating the aluminum on the aluminum oxide fusion. This is effected by maintaining a zone of cooled carbon monoxide gas above the liquid aluminum to maintain what is stated to be reducing conditions over the aluminum and means for feeding into the reduction zone of an electric furnace a granular or coherent mixture of aluminum oxide in fused state free of loose fines or powder. However, this patent is similarly unsatisfactory as the process disclosed therein, where the condensation is effected in a reactive atmosphere, negates any suitable recovery of aluminum metal.

In summary, the prior art has sought to produce aluminum in the condensed state without providing means to separate aluminum from reactive materials, or else has sought to condense aluminum from mixtures of aluminum and carbon monoxide vapors by rapid cooling to avoid back reactions. Neither approach has produced a commercially successful process.

It is accordingly clear that a need remains in the art for a process by which the vaporous mixture of aluminum and carbon monoxide can be condensed so as to recover substantial amounts of the free aluminum without combining with the other elements present in the vaporous mixture. Because an imbalance between carbon and oxygen can cause formation of carbides or oxycarbides, when carbon or oxygen predominate, respectively, a need also exists for accurate control of the components of this vaporous mixture.

SUMMARY OF THE INVENTION

It is accordingly one object of the present invention to provide a process for the production of substantially pure aluminum under carbothermic reduction.

A further object of the invention is to provide a process for the production of substantially pure aluminum metal by the reaction of aluminum oxide and a carbon containing material to form a completely vaporous mixture with subsequent condensation of the resulting vaporous mixture to recover substantially pure aluminum.

A still further object of the present invention is to provide a procedure wherein the vaporous mixture is condensed in a nonreactive environment such that the aluminum is recovered in substantially uncombined form.

An additional object of this invention is to provide an isolated process for the production of the aluminum carbide, $Al_4C_3$, and its use as feed for reaction with aluminum oxide to form the aluminum monoxycarbide, $Al_2OC$, and its use as the feed for the production of substantially pure aluminum under carbothermic reduction.

Other objects and advantages of the present invention will become apparent as the description thereof proceeds.

In satisfaction of the foregoing objects and advantages, there is provided by this invention a carbothermic process for the production of substantially pure aluminum metal which comprises: (a) introducing a feed comprising an aluminum oxide and at least one material selected from the group consisting of aluminum carbide and carbon into a heating zone; (b) maintaining the heating zone at an elevated temperature sufficient to quickly vaporize all products to essentially only gaseous aluminum and carbon monoxide; (c) contacting said vaporous mixture in the absence of a reactive environment with liquid aluminum at a temperature sufficiently low such that the vapor pressure of the liquid aluminum is less than the partial pressure of the aluminum vapor in contact with it and at a high enough temperature to prevent the reaction of carbon monoxide and aluminum and (d) recovering substantially pure aluminum therefrom.

In further satisfaction of these objects, a carbothermic process is herein provided that isolates the monoxycarbide, $Al_2OC$, as the accurately controlled feed source for the vaporous mixture. In additional satisfaction of these objects, a process is provided for an isolated reaction of aluminum carbide, $Al_4C_3$, with aluminum oxide, $Al_2O_3$, and producing aluminum monoxycarbide therefrom as the accurately controlled feed source for the vaporous mixture.

DESCRIPTION OF THE DRAWINGS

Reference is now made to the drawings accompanying this application wherein there is illustrated one type of apparatus suitable for conducting the process of the present invention.

DESCRIPTION OF THE PREFERRED EMBODIMENTS

Figure 1:
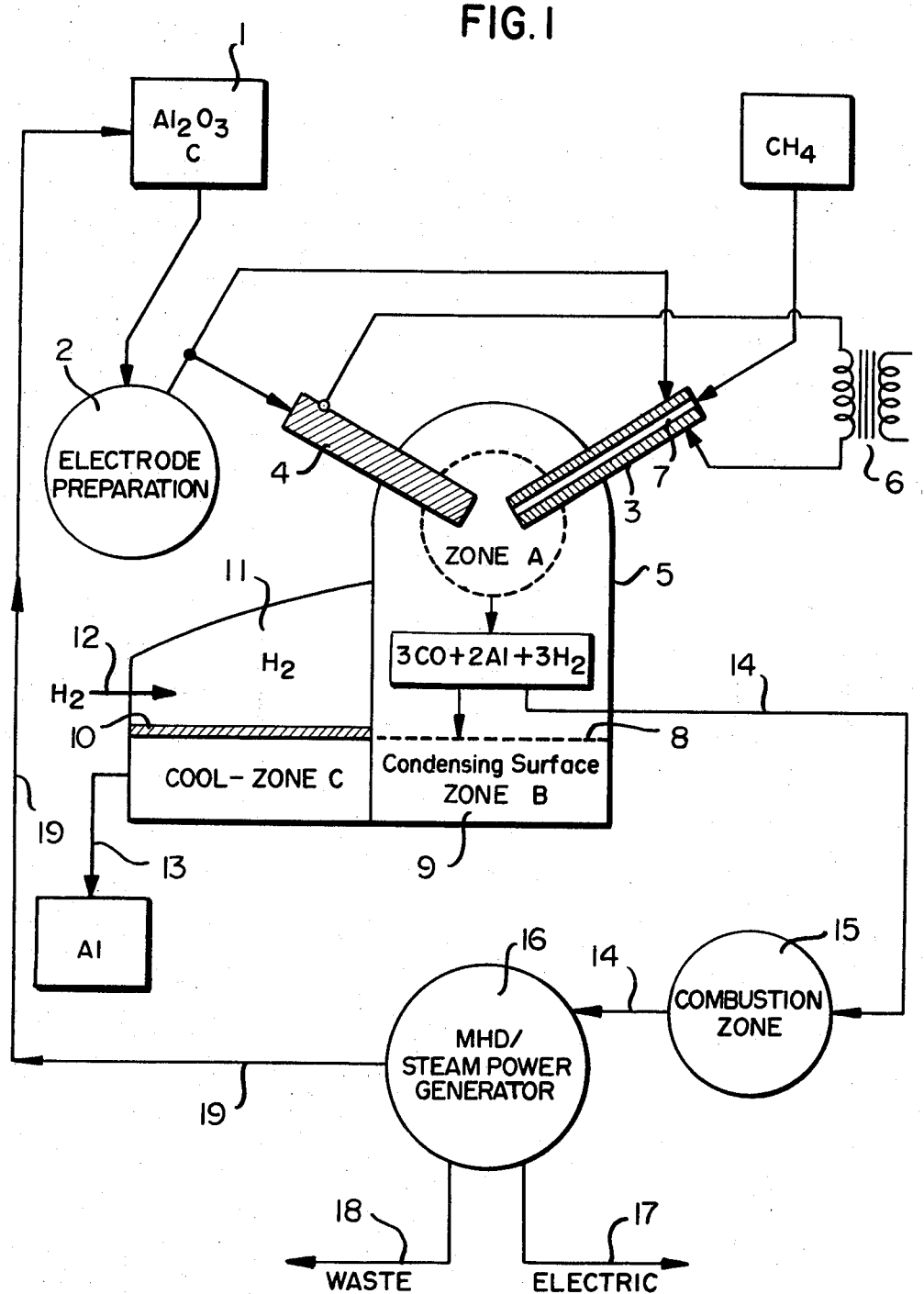
FIG. 1 shows the carbothermic process of S.N. 799,672.

As indicated above, the present invention is concerned with the production of commercial grade aluminum of at least 99% purity or better from metallurgical grade alumina or aluminum oxides by carbothermic reduction, and particularly to the temperature and pressure conditions under which the auminum can be condensed from a gaseous mixture consisting essentially of carbon monoxide and aluminum.

The invention is also concerned with processes and apparatus by which this reaction may be conducted.

In this reaction, mixtures of aluminum carbide and/or carbon and aluminum oxide, such as alumina ($Al_2O_3$), are heated to a temperature sufficient to produce a stoichiometric ratio or mixture of carbon monoxide and aluminum vapor by means known in the art. The temperature for forming this gaseous mixture is extremely high, being in the range of above 2600° K. or higher, for example, 2700° K. up to as high as 5000° K. A highly preferred temperature is 2600° K. to 2800° K.

In one procedure for conducting this initial step of the reaction, the alumina and carbon or aluminum carbide are mixed together in the preferred ratios and formed into baked electrodes by means known to those skilled in the art. One method comprises reacting the alumina and carbon in a resistance or electrically heated fluidized bed reactor to produce aluminum carbide and a carbon monoxide off-gas, the latter taken to the combustion chamber of a Magneto-Hydrodynamic (MHD) power unit. The aluminum carbide is then cooled and mixed with alumina to make electrodes. In one method, the carbon is in the form of graphite sleeves and the alumina and aluminum carbide are compacted within the sleeve. If methane is employed in the reaction, as described hereinafter, a duct or opening is left within the sleeve for methane introduction.

These electrodes are then operated against each other to form an electric arc and achieve the temperature desired of above about 2600° K. As a result of this step, the off gas produced will be a vaporous mixture of carbon monoxide and aluminum, the carbon monoxide combining with the oxygen as it is released from the alumina at these temperatures. Generally ratios of starting materials should be employed so as to achieve an off-gas ratio such that all of the carbon and oxygen present will be combined or at least only aluminum and carbon monoxide are present except for inert materials, the latter being present as a separate embodiment of the invention.

In conducting this reaction, insofar as apparatus is concerned, it is necessary to exclude other possible reactants, particularly those which would contain elemental carbon and for that reason, the walls of the container are preferably constructed of an inert refractory material which contains no free carbon such as calcium oxide, titanium carbide or zirconium oxide. As indicated above, as a result of the amounts and materials present, the resulting vaporous material will consist essentially of only gaseous aluminum and carbon monoxide. The carbon monoxide being formed under these extremely high temperature conditions from the carbon present and oxygen derived from the aluminum oxide.

In a separate embodiment of the invention, as mentioned above, there may also be introduced into the heating zone a quantity of an inert gas, such as argon or hydrogen or any hydrocarbon which decomposes to produce hydrogen. If a hydrocarbon is used, its quantity should be controlled with corresponding less use of carbon or aluminum carbide to insure that all carbon present will become combined as carbon monoxide in the arc heating stage. Hydrocarbon gas is thus useful as an additional source of carbon and also provides means by which the pressure in the heating zone can be controlled at will with the hydrogen thus obviating the need for removing the gases by pulling a vacuum on the system.

In a further embodiment for the initial step of the reaction, the raw materials, carbon and/or aluminum carbide and the aluminum oxide, may be converted to highly energized jets consisting initially of the carbon, aluminum and oxygen vapors, all of which are primarily in the form of monatomic gases. This technique is fully described in U.S. Pat. No. 2,979,449, discussed above. In this technique, which in itself provides a self-contained reaction zone characterized by the temperatures specified and further is constrained in free space to a specific geometry, whether the surrounding atmosphere is at high pressure or at high vacuum, the problem of maintaining furnace walls is eliminated. In conducting this technique, the reactants are introduced into a resistance-heated or electrically-heated fluidized bed reactor where they react at a temperature of about 2300° K. to produce aluminum carbide, CO and if methane is present, hydrogen. In a preferred aspect, two reactors are used and they cycle between the production of hydrogen and carbon in the bed and the production of carbon monoxide. However, the use of two fluidized bed reactors can be avoided by introducing the methane directly to the plasma jet and adjusting the amounts of carbon introduced with alumina to the fluidized bed reactor. The introduction of methane directly to the plasma jet has the advantage that only one fluidized bed reactor is required before the second reduction furnace and would eliminate the necessity of handling hydrogen. Then alumina, aluminum carbide and hydrogen (or hydrocarbon gas) are introduced to an electrically heated plasma arc where they react at a temperature equal to or greater than a temperature of 2600° K. Wall temperatures above the condensing surface are maintained at temperatures equal to or greater than 2400° K. Those parts of the wall below 2600° K. are constructed of materials containing no elemental carbon, such as calcium oxide, titanium carbide or zirconium oxide.

Use of the plasma arc or jet method constitutes a particularly important aspect as the plasma arc is a gas envelope which does not need to contact equipment walls at 260° K. and, therefor, the refractories would be less expensive.

For maximum recovery of aluminum, it is important to control the composition of the reactants so that the oxygen and carbon produced in the heating step are in the atomic ratio of 1:1. However, it is not easy to do so. If the carbon is in excess of this ratio, the mixture tends to make carbides. If the oxygen is in excess of this ratio, the mixture tends to make aluminum suboxides and/or complex oxy-carbide fused droplets. It is consequently important that the gas mixture which is produced have not only the same carbon-to-oxygen ratio as in carbon monoxide but also be handled under conditions where vaporization solely occurs and fusion does not occur.

Because of this tendency to fuse, it is apparent that a very careful selection of conditions is required in order to cause a simple mixture of alumina and aluminum carbide to react properly. For example, an electrode formed with mixtures of aluminum carbide and alumina appeared to fuse at a temperature below 2600° K. and disrupted the arc process.

It was found that heating alumina and aluminum carbide at temperatures above 2600° K. caused a spontaneous exothermic reaction between the carbide and the alumina, producing some gas and a black powder which condensed on cooled surfaces of the reactor. This powder was identified by X-ray diffraction to be almost entirely $Al_2OC$ although some elemental aluminum which was presented in the fusion remained in the bottom of the crucible.

It appears that $Al_2OC$ has the best properties for carrying out the carbothermic reduction of alumina because the desired carbon-to-oxygen ratio of 1:1 is locked therein, and on decomposition this compound produces aluminum vapor and carbon monoxide in the desired molar ratio of 2:1. Furthermore, at a sufficiently high temperature above 2600° K. the $Al_2OC$ decomposes to a vaporous mixture of aluminum and CO without going through a fusion which can be damaging from the standpoint of heat transfer rates.

As an example in carrying out the carbothermic reduction of alumina, the compound $Al_2OC$ was made by reacting $Al_4C_3$ with $Al_2O_3$ at a temperature slightly above 2600° K., and recovering the $Al_2OC$ as a condensed powder on the cool upper surfaces of the reactor vessel, then compressing it to bars which were decomposed in the heated zone of an arc to produce a mixture of aluminum vapor and carbon monoxide.

As another example, powdered $Al_2OC$ was fed to a plasma arc where it decomposed to produce a mixture of aluminum vapor and carbon monoxide which are passed above a condensation pool of molten aluminum according to the process of this invention.

In both of these examples of decomposing $Al_2OC$ with no other source of carbon or alumina present in the heating zone, there was no excess of carbon to produce unwanted $Al_4C_3$ and no excess of alumina to produce unwanted sub-oxides and aluminumoxy-carbides, some of which cause unwanted fusions. As an additional advantage in the heating step to produce a precisely controlled mixture of aluminum vapor and carbon monoxide, the compound $Al_2OC$ decomposes to form aluminum and CO without undergoing fusion, whereas it is difficult to control mixtures of $Al_2O_3$ and $Al_4C_3$ without having some premature fusion.

Prior art attempts to make aluminum, such as those reported by P. T. Stroup, in the 1964 Extractive Metallurgy Division Lecture of the Metallurgical Society of AIME, Feb. 20, 1964, concentrated on keeping the entire system functional in the liquid state. In contrast thereto, the $Al_2OC$, plus any condensed aluminum that may have been formed in the reaction between aluminum carbide and alumina, is transformed separately in the process of this invention into the vapor state from which aluminum is condensed at the high condensing temperature of this process without significant contamination.

After the vaporous gas is formed at the elevated temperatures, the mixture is then condensed in the absence of a reactive environment over a layer of liquid aluminum under conditions such that the vapor pressure of the liquid aluminum is less than the partial pressure of the aluminum vapor in contact with it and the partial pressure of carbon monoxide is low enough to prevent the reaction of any carbon monoxide present and aluminum. In conducting this aspect of the process, the aluminum vapor is condensed over a surface of liquid aluminum maintained at a temperature which depends on the pressure and amount of inert gas in the chamber, and is preferably as high as refractories will permit. In the examples shown, the condensing surface is maintained at 2400° K. No elemental carbon is permitted in the condensing area and as indicated no elemental carbon is permitted in the refractory sources in contact with the aluminum and carbon monoxide vapors when the temperatures of the surfaces are below the temperature of 2600° K. The pressure maintained in the condensing region is below that which gives a partial pressure of carbon monoxide sufficient to cause a reverse reaction to form aluminum oxide, aluminum carbide and/or aluminum oxy carbide mixtures. Under these conditions, the condensing recovery of aluminum depends on the mole ratio of carbon monoxide to aluminum produced in the heating reaction. At these pressures, all of the gases except for aluminum vapor are removed from the condensing zone which gases comprise carbon monoxide, hydrogen, if methane gas is used and a portion of the aluminum vapor. For example, based on eight moles of aluminum and four moles of carbon monoxide produced in the heating zone, it will be found in this example that about 1.5 moles of the aluminum vapor leaves the condensing zone with the carbon monoxide. Hence, a chemically stable mixture of the carbon monoxide, hydrogen and aluminum vapor is removed from the system at a temperature of at least 2400° K.

A indicated, at the bottom of the furnace, or initial condensation portion of the reactor, a layer of liquid aluminum is maintained at a temperature of at least about 2400° K. This liquid or condensed aluminum is further connected below a gas seal to a cooling chamber or zone where it is cooled to a temperature of about 1000° K. It has been found that these two different temperatures on the same aluminum layer may be effected simply by omission of insulation about the portion to be cooled. At the temperature of the cooling zone, i.e., 1000° K., it has also been found that the exposed surface of the melt will be covered with a flux or crust which serves to further inhibit any reactions in the 1000° K. cooling zone.

In the main reactor where the aluminum layer is maintained at a temperature of 2400° K. for initial condensation, a major portion of the gaseous aluminum present will condense on the liquid bed and will then be moved in the deep bed to the 1000° K. cooling zone out of contact with elemental carbon where it may be recovered.

As indicated above, under the conditions in the furnace, sufficient pressure is maintained to exhaust the chemically stable mixture of carbon monoxide, hydrogen and a small portion of aluminum from the condensation zone, allowing the remaining aluminum vapor to condense on the fluid layer in the absence of a reactive environment. This total pressure in the condensing region is below that sufficient to give a partial pressure of carbon monoxide sufficient to cause reversible reactions to form aluminum compounds. This total pressure may conveniently be controlled by introduction of the inert gas. While this total pressure may vary depending on other conditions and may range from about 0.5 atm. to 100 atm., it has been found that, at a temperature of 2400° K., a pressure of about 0.5 to 5 atmospheres is adequate.

The temperature in the condensation region should be maintained such that the vapor pressure of the liquid aluminum is less than the partial pressure of the aluminum vapor, but the temperature should be high enough to prevent the reaction of carbon monoxide and aluminum. The temperatures specified herein are adequate in that respect. However, it is to be understood that as other conditions of the process are varied, the specific temperatures mentioned will also be varied.

It is to be emphasized in this respect that the higher the temperature in the condensation zone, the more efficient is the process as the higher the temperature, the less aluminum vapor will be contained in the off gas chemically stable mixture. Hence, it is preferred to condense as much above 2400° K. as possible under the conditions of the process.

In the cooling zone (1000° K. zone), the atmosphere above the aluminum layer is essentially an inert gas such as hydrogen, argon, nitrogen, helium or the like, to prevent further reaction of the aluminum. This may be conveniently effected by introduction of the gas via a separate conduit or line or by other suitable means such as by use of the inert gas from the condensation chamber.

The off gases from the condensation step, comprising the chemically stable mixture of CO, $H_2$ and aluminum at about 2400° K., may be treated in any desired manner. However, in a preferred aspect after removal from the condensation region, they are combined with the CO from the fluid bed reactor and burned in the combustion zone of an MHD generator and thus can be used to generate power.

In a preferred embodiment, the off gases are removed from the system under pressure as described. However, it is also within the scope of the invention to also pull a vacuum on the system in order to effect their removal. If this latter aspect is employed, it is of course to be understood that the system is not operated under the pressures described above.

Referring now to the drawing accompanying this invention wherein one embodiment of the present invention is shown and a suitable apparatus presented therefor, it will be seen a complete cyclic process is shown wherein all recoverable components of the system are utilized in the recovery of aluminum and generation of electricity.

In the schematic drawing shown, in FIG. 1, alumina ($Al_2O_3$) (1.0 mol) and carbon (1.5 mol) from zone 1 are prepared into electrodes in preparation zone 2. The electrodes 3 and 4 are then operated against each other in furnace 5 heated by electricity generated at 6. In the electrode preparation, a duct is left in electrode 3 for the introduction of 1.5 mol of methane.

The electrodes are operated against each other in zone A at a temperature of at least 2700° K. and a pressure of 1.86 atmospheres. From this reaction, there is formed a vapor consisting of 3 moles carbon monoxide, 2 moles aluminum and 3 moles hydrogen. Under these conditions most of the aluminum vapor condenses on the condensing surface 8 of liquid aluminum layer 9, the temperature at the condensing surface being about 2400° K. The condensed aluminum in zone B then connects below a gas seal to zone C maintained at about 1000° K. In this zone liquid aluminum layer 9 is covered with a flux or crust 10. Above the flux 10, an inert atmosphere is provided in area 11 to prevent any reaction of the aluminum, in this case by the introduction of hydrogen gas through line 12. The substantially pure aluminum is then recovered from zone C by line 13. Using the molar ratios given, about 1.52 moles of aluminum are recovered.

From the condensation area, after the aluminum has condensed, the gases comprising a chemically stable mixture of 3 moles carbon monoxide, 3 moles hydrogen and 0.48 mole of the aluminum vapor is removed from the system through line 14 by the pressure in the reactor, and sent to combustion zone 15 where it is burned in air at about 2400° K. This combustion zone 15 is the combustion zone of a MHD steam power generator 16, shown schematically. These hot gases are sufficient to generate about 2.6 kwh. of electricity per pound of aluminum from line 17, with about 1.7 kwh. electricity per pound of aluminum being shown as waste in 18.

From MHD generator 16, the aluminum from the burned off gas mixture is recovered as aluminum oxide, about 0.24 moles, which may be returned to the system via line 19 to be made up into fresh electrodes.

It is thus apparent that the process of the invention provides a means whereby substantially pure aluminum can be produced from aluminum oxide and the by-products utilized to generate electricity to operate the process and recovered $Al_2O_3$ can be recycled to the system. It is clear that many variations can be made in this process including use of the jets and plasma arc described herein. It is also apparent that other variables may be incorporated into operation of the process but all such variables are considered to be within the scope of the invention. For example, the off gases need not be utilized to power a MHD generator but may be processed in any desired manner as by passing them through a filter.

Figure 2:
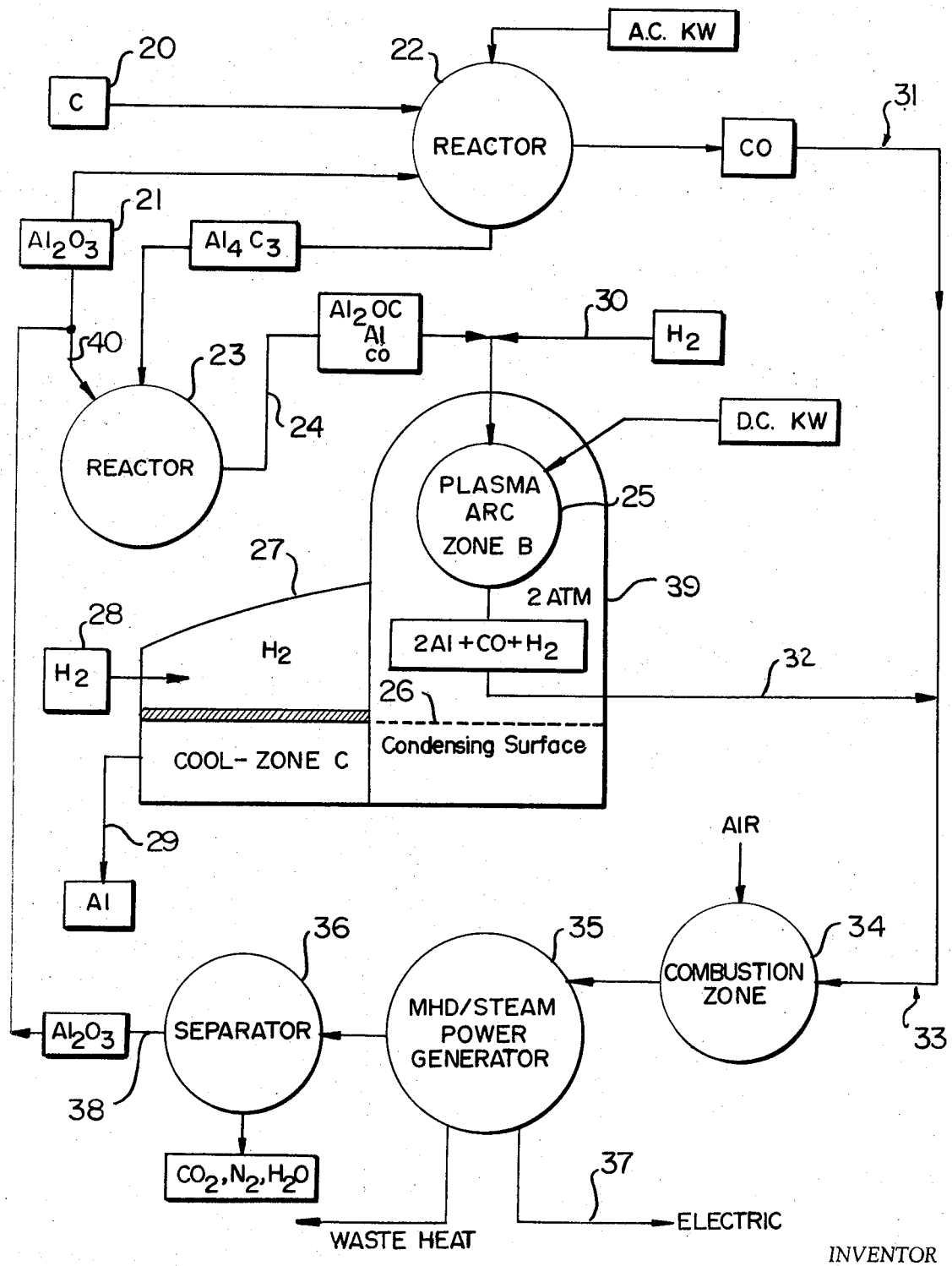
FIG. 2 shows the process of this invention.

The monoxycarbide embodiment of the invention is illustrated in FIG. 2 which shows a complete cyclic process wherein all recoverable components of the system are utilized in the recovery of the aluminum and generation of electricity. As schematically shown in FIG. 2, carbon 20 and alumina 21 are reacted, for example in an electrically heated fluidized bed reactor 22, to produce $Al_4C_3$ and CO. The CO is fed through line 31 to the combustion zone 34. The $Al_4C_3$ is fed to the reactor 23 where the $Al_4C_3$ is reacted with alumina entering through line 40 to form a fusion from which some gaseous Al, Co, and $Al_2OC$ are produced, the condensation of $Al_2OC$ being caused by cooling the mixture to a temperature of about 2400° K. in the line 24 so that the $Al_2OC$ becomes a powder which is swept along with condensed aluminum (about 12% of the stream) and CO. After admixture with hydrogen entering through line 30, the materials are swept into a plasma arc 25 inside the furnace 39, where the $Al_2OC$ is decomposed to aluminum vapor and CO, so that the combined products from the plasma arc 25 are aluminum vapor, CO and $H_2$.

From this mixture, aluminum is condensed in the absence of a reactive environment over the surface of a layer of liquid aluminum 26 under conditions of temperature such that the vapor pressure of the liquid aluminum is less than the partial pressure of the aluminum in contact therewith, and under admixture conditions such that the partial pressure of CO is low enough to prevent the reaction of any CO present with aluminum vapor.

Uncondensed aluminum plus the CO and the $H_2$ leave the condensing chamber 39 through line 32 and join the line 31 through which excess CO from the reactor 22 enters the combustion zone 34 in line 33. The products from the combustion zone 34 then enter the MHD/steam power generator 35 which produces waste heat and electricity 37, the remaining $Al_2O_3$ being removed in the separator 36 from the CO, $N_2$ and $H_2O$ in the exhaust stream. The separated $Al_2O_3$ moves through the line 38 to become the feed 21 for the reactor 22, a portion being diverted through the line 40 to the reactor 23. The liquid aluminum within the furnace 39 moves through a liquid seal into the relatively cool zone C above which pure hydrogen is maintained as an inert atmosphere in area 27.

The process has been described herein with reference to certain specific embodiments. However, as obvious variations thereof will become apparent to those skilled in the art, all such obvious variations are intended to be covered herein.

What is claimed is:

1. A carbothermic process for the production of pure aluminum metal which comprises:
   (a) decomposing the monoxycarbide, $Al_2OC$, at a temperature of from about 2600° K. to 5000° K. to completely vaporize all products to essentially only gaseous aluminum and carbon monoxide;
   (b) contacting the vaporous mixture in the absence of a reactive environment with liquid aluminum at a temperature low enough so that the vapor pressure of the liquid aluminum is less than the partial pressure of the aluminum vapor in contact with it and high enough to prevent the reaction of carbon monoxide and aluminum; and
   (c) recovering the substantially pure aluminum which is thereby condensed.

2. The process of claim 1 wherein said temperature is from 2600° K. to 2800° K.

3. The process of claim 2 wherein said monoxycarbide is condensed by cooling to temperatures below 2400° K.

4. The process of claim 2 wherein said monoxycarbide is condensed to a powder which is compressed into bars which are decomposed in the heated zone of an arc to produce said vaporous mixture.

5. The process of claim 2 wherein said monoxycarbide is produced as a part of a first vaporous mixture by reacting aluminum carbide, $Al_4C_3$, with aluminum oxide, $Al_2O_3$, in an isolated reaction.

6. The process of claim 5 wherein said monoxycarbide in said first vaporous mixture is condensed as an entrained powder which is swept along to a plasma arc wherein said monoxycarbide is decomposed to produce said vaporous mixture.

References Cited

UNITED STATES PATENTS

| | | | |
|---|---|---|---|
| 3,338,708 | 8/1967 | Shiba | 75—68 R |
| 3,505,063 | 4/1970 | Schmidt | 75—67 |
| 3,410,680 | 11/1968 | Sparwald | 75—68 R |
| 2,829,961 | 4/1968 | Miller | 75—10 A |
| 3,342,250 | 9/1967 | Treppschuh | 75—10 R |

L. DEWAYNE RUTLEDGE, Primary Examiner

P. D. ROSENBERG, Assistant Examiner

U.S. Cl. X.R.

75—68